Sept. 28, 1954    A. J. MORSCHEL    2,690,079
PRESSURE COMPENSATING GAUGE
Filed June 1, 1951    2 Sheets-Sheet 1
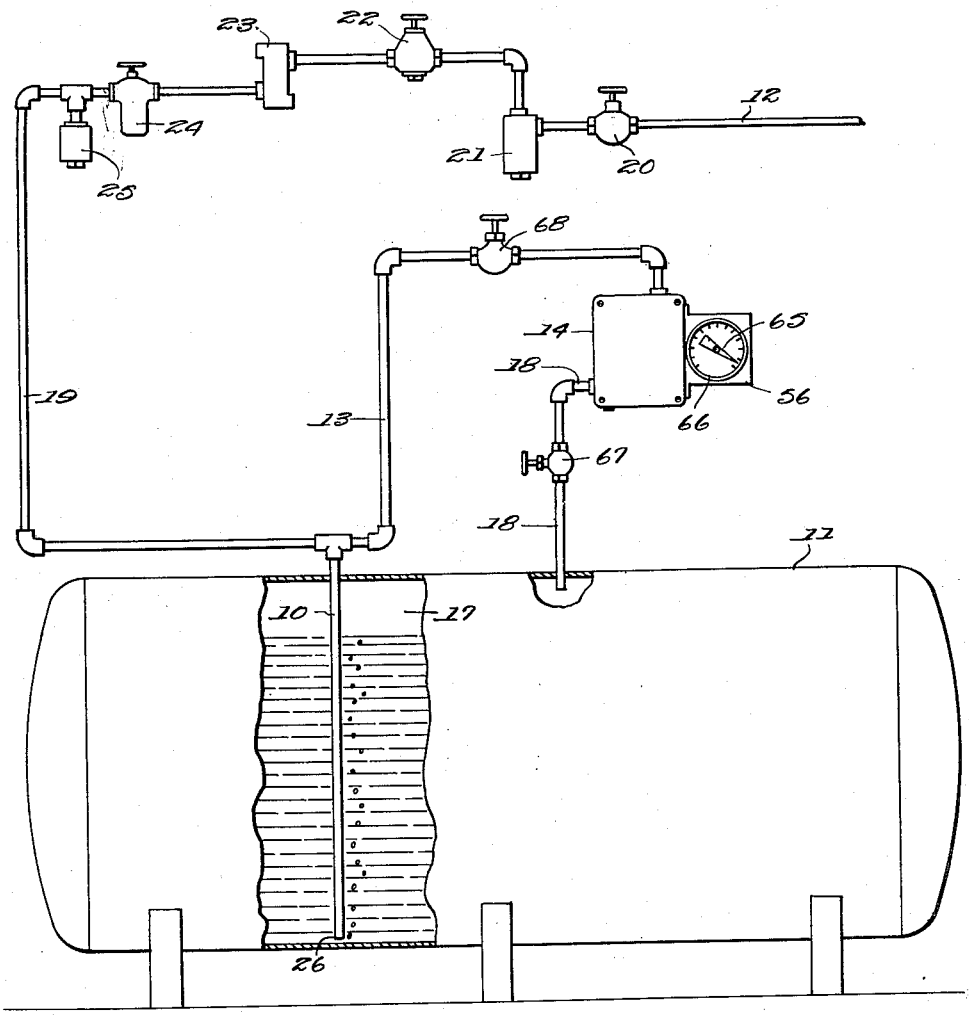
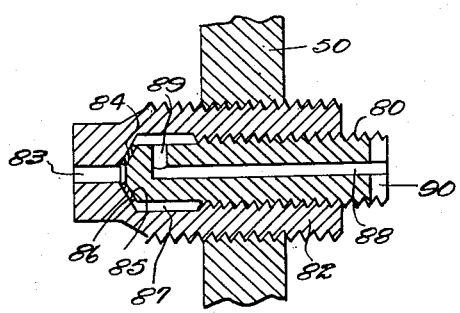
INVENTOR.
Albert J. Morschel,
BY Victor J. Evans & Co.
ATTORNEYS Sept. 28, 1954  A. J. MORSCHEL  2,690,079
PRESSURE COMPENSATING GAUGE
Filed June 1, 1951  2 Sheets-Sheet 2
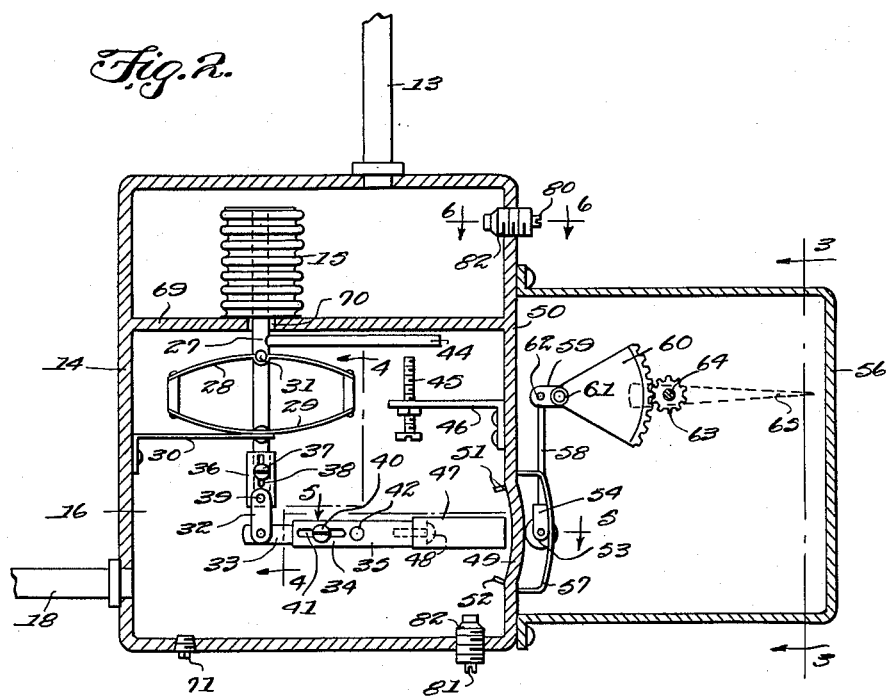
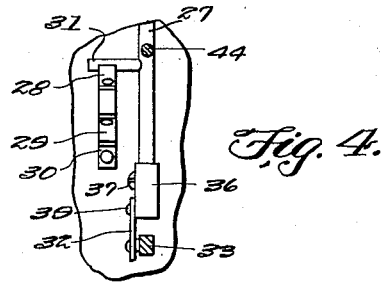
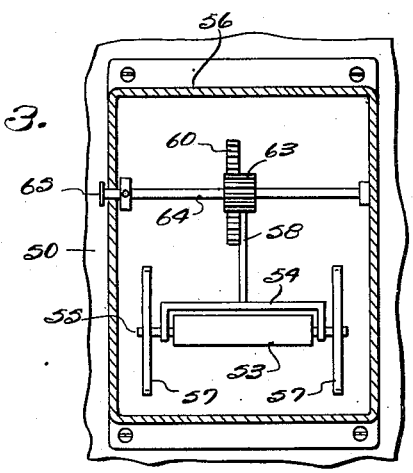
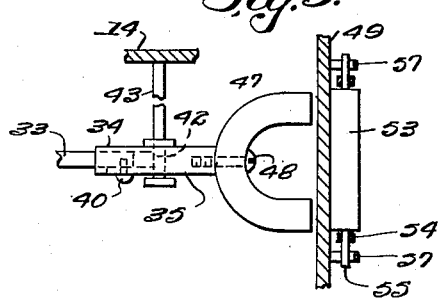
INVENTOR.
Albert J. Morschel,
BY Victor J. Evans &Co.
ATTORNEYS Patented Sept. 28, 1954

2,690,079

UNITED STATES PATENT OFFICE 2,690,079

PRESSURE COMPENSATING GAUGE

Albert J. Morschel, Yonkers, N. Y., assignor to Liquidvision Gauge and Control Corporation, Oceanside, N. Y., a corporation of New York Application June 1, 1951, Serial No. 229,343

3 Claims. (Cl. 73—407)

This invention relates to a pressure gauge for use in apparatus for determining the level of liquids in sealed or vented tanks, and in particular a device for indicating the liquid level by the pressure developed by the head of liquid in a tank with the pressure acting upon a pressure responsive element that is connected to an air bell that extends downwardly through the liquid of the tank and wherein the air bell is connected to a source of constant air through a shut off valve, filter, pressure regulator, choke valve, bubbler, and condensate trap.

Various devices have been provided for indicating the level and also the amount of liquid in a tank through indirect connections and without opening the tank but these require floats and other mechanical instrumentalities which are necessarily positioned in the tank and devices of this type are objectionable. With this thought in mind this invention contemplates an improved method of determining the quantity of liquid in a tank by connecting a pressure responsive element to an air bell in a tank and with air supplied at a constant pressure through a tube extended downwardly through the liquid in the tank and to a point spaced from the lower end thereof.

The object of this invention is, therefore, to provide means for indicating the amount of liquid in a tank by subjecting a pressure responsive element to the pressure developed by the head of liquid in a tank wherein the pressure head is provided by a continuous source of air supplied to the liquid in the tank.

Another object of the invention is to provide a liquid level gauge for a tank in which the gauge is actuated by a pressure responsive element actuated by the head of liquid in the tank and in which the apparatus may readily be installed in tanks now in use.

A further object of the invention is to provide a liquid level indicator for tanks wherein the level of the liquid is determined by the pressure developed head of the liquid in the tank, which is of a simple and economical construction.

With these and other objects and advantages in view the invention embodies a tank having a supply tube extended downwardly to a point spaced from the lower end thereof with the tube connected to a continuous source of air supply through a filter, regulator and a choke valve and with the tube also connected to a pressure responsive element in a gauge wherein the opposite side of the pressure responsive element is connected to the vapor space above the liquid level in the tank.

Other features and advantages of the invention will appear from the following description taken in connection with the drawings wherein:

Figure 1 is an elevational view illustrating the relative positions of the parts of the indicating device with part of the tank on which the device is installed broken away showing the supply tube extended downwardly to a point spaced from the lower end thereof.

Figure 2 is a view showing a longitudinal section through the casing of the pressure responsive element.

Figure 3 is a cross section through the casing taken on line 3—3 of Figure 2.

Figure 4 is a detail taken on line 4—4 of Figure 2 showing the connection of the pressure responsive element to a magnet carrying lever.

Figure 5 is a sectional plan through the lower part of the casing taken on line 5—5 of Figure 2.

Figure 6 is a detail showing a section on line 6—6 of Figure 2, illustrating a release screw.

Referring now to the drawings wherein like reference characters denote corresponding parts the liquid level indicating device of this invention includes an air bell or supply tube 10 extended downwardly into a tank 11 with the tube 10 connected to a constant source of air supply from a pipe 12 and with the tube 10 connected by a tube 13, as shown in Figure 1, to the upper side of the housing 14 in which the pressure responsive element or bellows 15 is located, as shown in Figure 2, and with the opposite or lower compartment 16 of the casing 14 connected by tube 18 to the vapor space 17 above the liquid level in the tank.

The air bell or supply tube 10 is connected to a constant source of air supply from the pipe 12 through a pipe 19 with a shut off valve 20 connected to the pipe 12 and with a filter 21, a pressure regulator 22, a choke valve 23, a bubbler 24 and a condensate trap 25 connected in the pipe between the valve 20 and tube 10. The tube 10 extends downwardly to a point 26, spaced from the lower end of the tank.

A source of constant air flows through the parts 20, 21, 22, 23, 24 and 25 from the pipe 12 and through the pipe 19 to the air bell 10. The pressure of this constant air builds up within the air bell 10 until it reaches the pressure developed by the head of liquid in the tank. This pressure acts back through the return line 13, acting upon the head of the bellows 15, shown in Figure 2, and whenever this air pressure changes the head of the bellows moves and imparts its motion to indicating means through a push rod 27. The push rod compresses a double leaf or flat spring having upper and lower spring straps 28 and 29 mounted on a bracket 30 and acted upon by a pin 31 extended from one side of the push rod 27, as shown in Figure 4.

The lower end of the push rod 27 is connected by a link 32 to a bar 33 which is adjustably mounted in a sleeve 34 extended from a lever 35. A sliding collar 36 is provided on the lower end of the push rod 27 and the collar is adjustably connected to the push rod by a screw 37 that extends through a slot 38. The link 32 is connected to the collar by a pin 39. The bar 33 is connected to the sleeve 34 by a screw 40 that extends through a slot 41. The lever 35 is pivotally mounted by a pin 42 on a bracket 43 extended inwardly on one side of the casing 14.

The push rod 27 is also provided with an arm 44 that is positioned to contact the end of an adjusting screw 45 carried by a bracket 46 which limits downward movement of the push rod.

As illustrated in Figures 2 and 5 a magnet 47 is mounted by a screw 48 on the extended end of the lever 35, and the magnet is positioned to face an arcuate section 49 in a wall 50 of the casing. The inner surface of the wall 50 is provided with stops 51 and 52 for limiting upward and downward travel of the magnet. With the parts arranged in this manner the magnet moves upwardly and downwardly with contraction and expansion of the bellows 15.

The magnet is positioned to influence a roller 53 which is carried in a yoke 54 by a shaft 55 in a cover 56 on the outside of the casing 14 and the ends of the shaft extend through arcuate guides or rails 57 which prevent the roller 53 being jarred loose from the field of the magnet 47 by shocks and jars and particularly when the instrument is used on ships and other moving vehicles. The yoke 54 is suspended by a rod 58, from an arm 59 on a gear segment 60 which is pivotally mounted on a shaft 61 and the rod is connected to the arm 59 by a pin 62. The gear segment 60 is positioned to mesh with a pinion 63 on a shaft 64 that is journaled in the cover 56 and a pointer 65, carried by the outer end of the shaft is positioned to coact with graduations 66 on the outer surface of the cover.

The tube 13 is provided with a shut-off valve 68 for shutting off the measuring tube 13 and a release screw 80 is provided in the upper part of a housing 14 for releasing the pressure that acts on the bellows 15 caused by the head of liquid in the tank when it is desired to check the zero position of the pointer 65. The tube 18 is provided with a similar shut-off valve 67 to close off the vapor pressure or vacuum in the tank from the lower compartment 16 of the housing 14 and the compartment 16 is also provided with a release screw 81 to release the pressure of vacuum therein.

The casing 14, which may be located at a convenient point, is provided with an intermediate partition 69 having an opening 70 therein through which the push rod 27 extends. The casing is also provided with a drain plug 71, as shown in Figure 2.

In operation the gauge is provided with a source of air which flows through valve 20, filter 21, pressure regulator 22, choke valve 23, bubbler or air flow indicator 24, condensate trap 25, tubing 19, to air bell or tube 10 and when the pressure developed by this air supply in the air bell equals the pressure developed by the head of liquid in the tank, this pressure, which is an indication of the level of the liquid in the tank, moves the bellows 15, through the return tube 13. The bellows actuates the pointer through the push rod 27, lever 35, and magnet 47, and the magnet field passes through the non-magnetic housing or casing whereby the roller 53 is caused to actuate the pointer.

From the foregoing description it will be understood that the pressure generated by the column of liquid in the tank coacts from the air bell back through the return line 13 on the head of the bellows 15 and the vapor pressure or vacuum is inserted through the equalizing line 18. This pressure or vacuum opposes the movement of the bellows head on the under side and the bellows movement is directly proportional to the net pressure developed by the head of liquid in the tank. It will be noted, therefore, that the pressure or vacuum confined within the lower part of the housing 14 does not affect the pointer movement. The pressure developed by the head of liquid is directly proportional to the height of the column of liquid in the tank and this pressure, which is an indication of the volume of liquid in the tank, acts on the bellows head as hereinbefore described. The equalizing line 18 introduces an opposing force under the head of the bellows whereby the pointer indicates on the scale the exact pressure developed by the head of liquid.

This equalizing or compensating line 18, therefore, compensates for pressure or vacuum that exists above the upper surface of liquid in the tank so that this pressure or vacuum does not interfere with the operation of the device.

It will also be understood that the positions of the magnet and roller may be reversed with the magnet on the outside instead of on the inside of the wall 50 and it will also be understood that magnets may be used on both sides of the wall.

Where pressure or vacuum is applied to the tank this pressure or vacuum that occurs in the vapor space above the liquid level acts through the compensating tubing on the opposite side of the bellows and thus eliminates any errors due to either pressure or vacuum.

The upper and lower compartments of the casing 14 are provided with release screws 80 and 81 for permitting the operator to release pressure from the two compartments simultaneously whenever he desires to check the pointers zero position, after the valves 67 and 68 are shut off. The screws are threaded in bushings 82 having openings 83 in the inner ends, and washers 84 are positioned between conical shaped inner ends 85 of the screws and similar seats 86 in the bushings.

The bushings are provided with counterbores 87 and bores 88, which extend inwardly from the outer ends of the screws and communicate with the counterbores through side openings 89. The outer ends of the screws are provided with screwdriver slots 90.

It will be understood that modifications may be made in the design and arrangement of the parts without departing from the spirit of the invention.

What is claimed is:

1. A differential pressure gauge, comprising a pressure responsive element one side of which is connected to a low point in the container and the other to a high point in the container, a sealed casing in which the pressure responsive element is positioned, a lever pivotally mounted in said sealed casing, a magnet carried by one end of the lever, an adjustable connection connecting the end of the lever opposite to that on which the magnet is carried to the pressure responsive element, said lever positioned whereby the magnet is spaced from the inner surface of one side of the casing, a box-like cover positioned against the outer surface of the casing and positioned on the section of the casing from the inner surface of which the magnet is spaced, a gear segment pivotally mounted in the cover, a roller connected by a rod to the gear segment and positioned to follow the magnet, said roller being of material having magnetic attraction, a shaft journaled in said cover, a pinion on said shaft positioned to mesh with the gear segment, and a pointer carried by an end of the shaft extended through the cover, said cover having a dial on a face thereof and said dial positioned around the shaft and adapted to coact with the pointer whereby the movement of the roller in following the magnet actuates the shaft to turn the pointer around the dial to indicate the pressure differential between a low point of a container and a high point thereof.

2. A differential pressure gauge, comprising a substantially sealed casing having a partition dividing the casing into upper and lower sections, a pressure responsive element positioned in the upper section of the casing and mounted on the partition, a yielding element mounted in the lower section of the casing and positioned below the pressure responsive element, a lever pivotally mounted in the lower section of the casing, a magnet carried by one end of the lever, an adjustable connection connecting the end of the lever opposite to that on which the magnet is positioned to the yielding element with the yielding element and lever connected to the pressure responsive element, said lever being pivotally mounted whereby the magnet is spaced from the inner surface of a wall of the casing, a cover positioned on the outer surface of the wall of the casing from the inner surface of which the magnet is spaced, a gear segment pivotally mounted in the cover, a roller of material having magnetic attraction in the cover and positioned against the outer surface of the wall of the casing from the inner surface of which the magnet is spaced, means connecting the roller to the gear segment, a shaft journaled in the cover, a pinion mounted on the shaft and positioned to mesh with the segment, a dial positioned on the outer surface of the cover and extended around the shaft, and a pointer carried by an end of the shaft extended through the cover and dial whereby the pointer is actuated by the magnet and roller.

3. A differential pressure gauge, comprising a casing having upper and lower compartments therein with connections extended from said compartments and adapted to be extended to upper and lower points of a container, a pressure responsive element positioned in one of said compartments, a push rod extended from the pressure responsive element into another of said compartments, a yielding element including oppositely disposed arcuate spring straps positioned in said other compartment and adapted to be compressed by the push rod, a lever pivotally mounted in said other compartment and positioned with one end pivotally connected to the push rod and the other adapted to travel in spaced relation to the inner surface of one of the walls of the casing, a magnet carried by said lever, a roller positioned on the outer surface of the wall of the casing and adapted to be influenced by the magnet of the lever, a cover positioned over said roller, a segment pivotally mounted in the cover and pivotally connected to the roller, a dial on the outer surface of the cover, and a pointer actuated by the segment and positioned to coact with the dial to indicate the differential in pressure between upper and lower parts of a container to which the connections of the casing extend.

References Cited in the file of this patent

UNITED STATES PATENTS

| Number | Name | Date |
|---|---|---|
| 2,001,853 | Seward | May 21, 1935 |
| 2,233,572 | Atkins | Mar. 4, 1941 |
| 2,345,464 | De Giers | Mar. 28, 1944 |
| 2,425,691 | Brewer | Aug. 12, 1947 |
| 2,509,644 | Kinderman | May 30, 1950 |
| 2,554,374 | Melas | May 22, 1951 |
| 2,577,548 | Vetter | Dec. 4, 1951 |